United States Patent [19]
Kelbel

[11] 4,269,294
[45] May 26, 1981

[54] AUTOMATIC CLUTCH

[75] Inventor: Donald W. Kelbel, Muncie, Ind.

[73] Assignee: Borg-Warner Corporation, Chicago, Ill.

[21] Appl. No.: 66,720

[22] Filed: Aug. 15, 1979

[51] Int. Cl.³ .................. F16D 11/00; F16D 15/00
[52] U.S. Cl. .................. 192/54; 192/67 R; 192/93 A; 192/114 R
[58] Field of Search .................. 192/93 A, 54, 31, 35, 192/36, 114 R, 67 R, 93 R

[56] References Cited

U.S. PATENT DOCUMENTS

| | | | |
|---|---|---|---|
| 3,217,847 | 11/1965 | Petrak | 192/67 R |
| 3,656,598 | 4/1972 | Goble | 192/114 |
| 4,159,050 | 6/1979 | Hopkins et al. | 192/114 X |
| 4,163,486 | 8/1979 | Kagata | 192/35 |
| 4,192,411 | 3/1980 | Fogelberg | 192/36 |

Primary Examiner—George H. Krizmanich
Attorney, Agent, or Firm—Julian Schachner

[57] ABSTRACT

A clutch for automatically engaging a driving member with a driven member upon application of torque to rotate the driving member in either direction, for maintaining engagement in either the drive or coast mode of operation and during the transition between drive and coast, for maintaining engagement in either the forward or reverse mode of operation and during the transition between forward and reverse, and for disengaging automatically upon interruption of the torque and slight rotation in the opposite direction.

6 Claims, 6 Drawing Figures

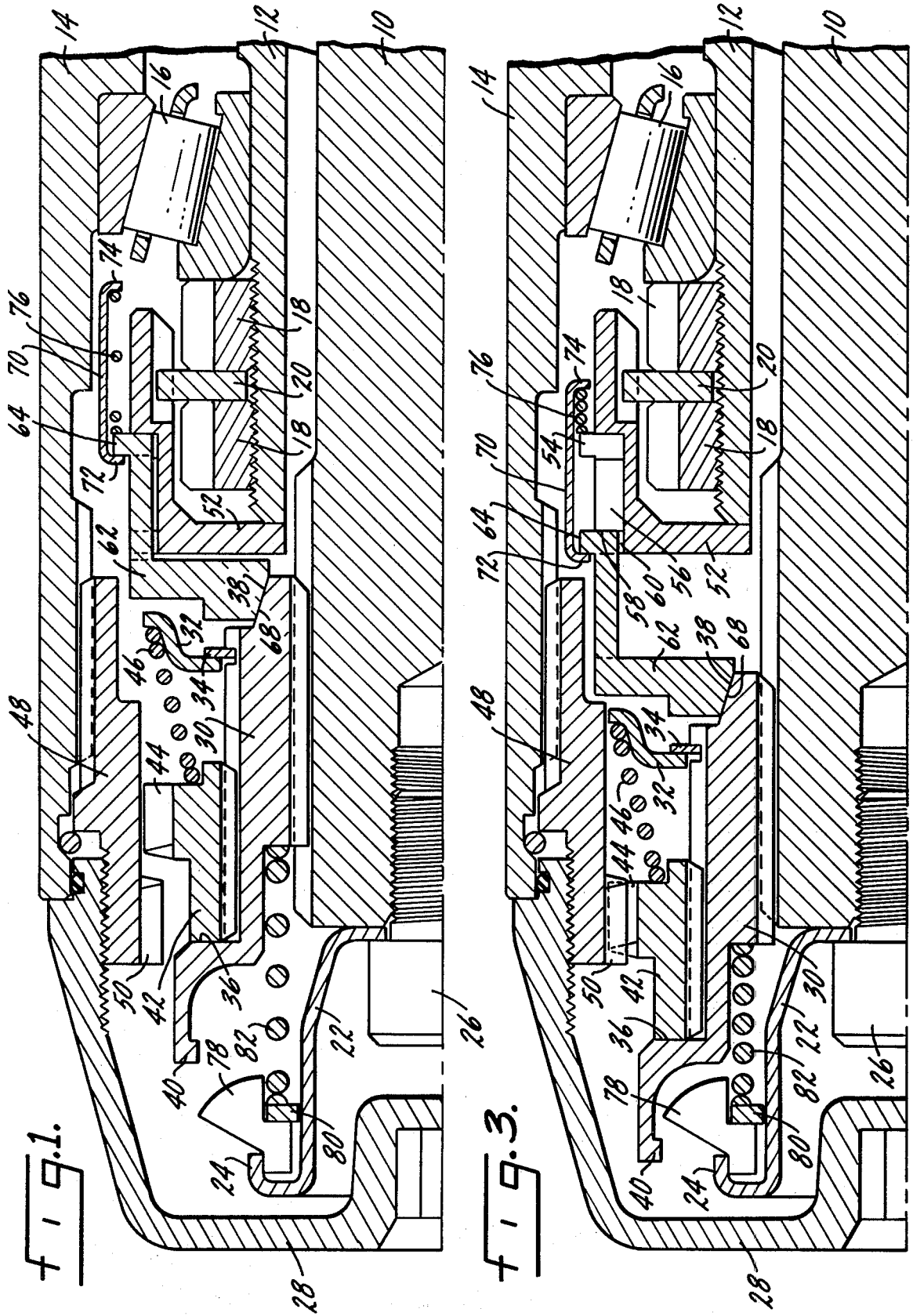

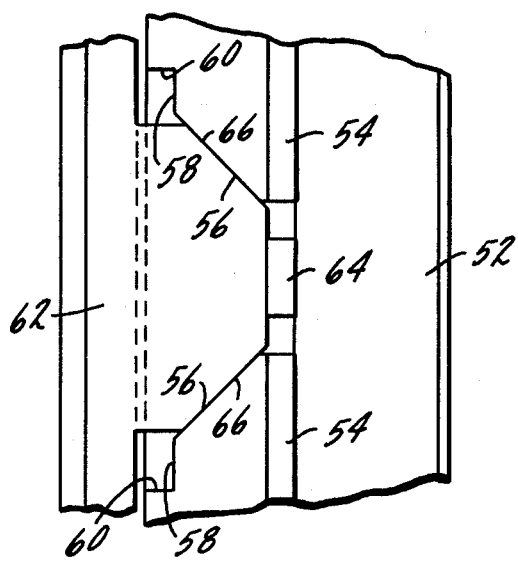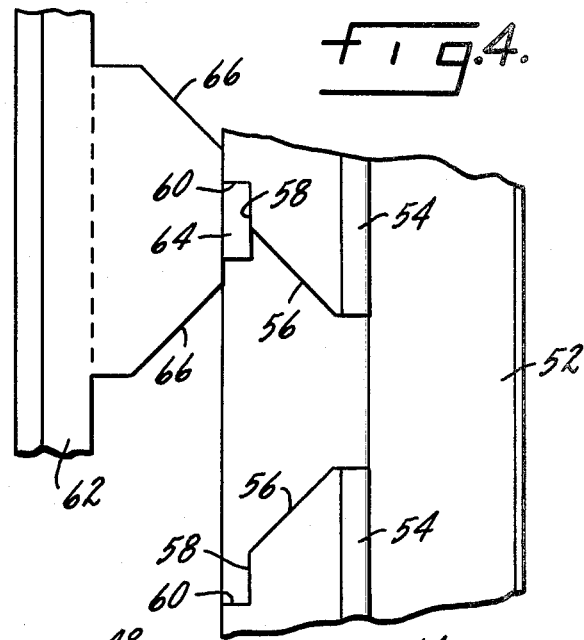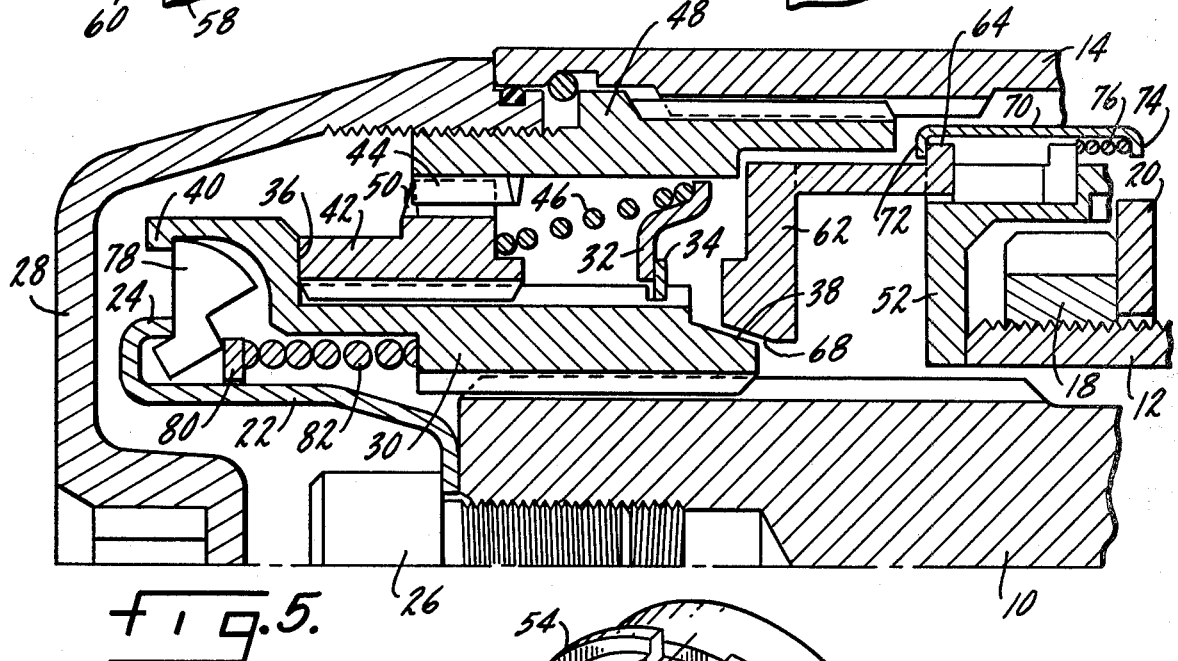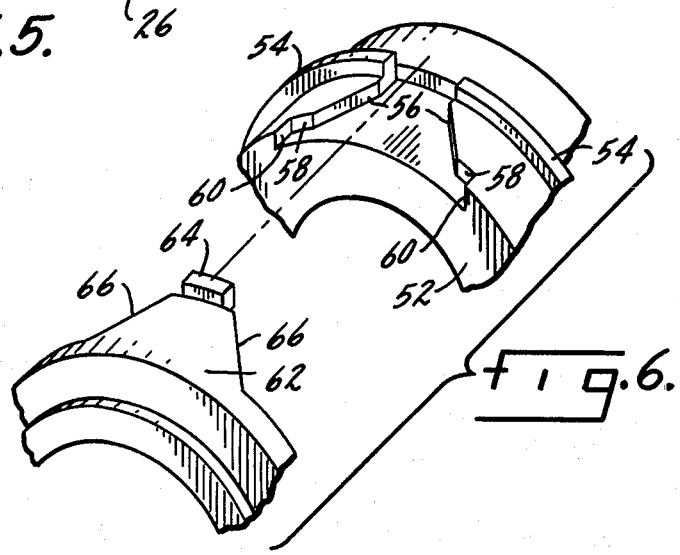

AUTOMATIC CLUTCH

BACKGROUND OF THE INVENTION

This invention relates generally to clutches. More particularly, it relates to a clutch for use in effecting locking engagement between a drive axle and a wheel of a four-wheel drive vehicle upon the application of power to the drive axle. The clutch automatically effects disengagement upon cessation of the application of power to the drive axle, together with a direction reversal.

Heretofore, various mechanisms have been used for engaging a drive axle with its associated wheels in a four-wheel drive vehicle. One such mechanism in the form of a wheel hub normally is disengaged to allow the wheel to rotate independently of the axle. This requires that the operator lock a pair of hubs manually to engage the drive axle and wheels, and to unlock them manually to disengage.

Another such mechanism provides an overrunning clutch which engages automatically when power is applied to the drive axle and when operation is in the drive mode. However, such an overrunning clutch inherently disengages upon operation in the coast mode. In other words, the overrunning clutch engages when the rotational speed of the axle tends to exceed the rotational speed of the wheel, but disengages when the rotational speed of the wheel tends to exceed that of the axle. Such an overrunning clutch generally provides some means by which the operator may override manually to insure locking engagement between the axle and wheel.

Yet another such mechanism provides a clutch which operates in response to the application of power to the drive axle by moving pins into slots so as to engage the axle with its associated wheel. Although a mechanism of this type will effect engagement in either the drive or coast mode of operation, there is the possibility that the pins could slip out of the slots during movement between the drive and coast modes, in which case the clutch would disengage and then re-engage automatically. At normal operating speeds such disengagement and re-engagement could cause severe shocks to the clutch components and, indeed, to the entire driveline. This would result in a dangerous and possibly destructive condition. Further, in a float condition wherein the axle is rotating but no torque is transferred between the axle and wheel, an inadvertent tendency for movement between the drive and coast modes could develop. This also could cause the clutch to disengage and then re-engage, thus establishing the same dangerous condition.

U.S. Application Ser. No. 799,793, filed May 23, 1977, is directed to an automatic clutch which overcomes the deficiencies of the prior mechanisms. As disclosed therein, the clutch automatically engages a drive axle and an associated wheel upon engagement of a four-wheel drive system, maintains engagement positively in the drive and coast modes of operation as well as during the transition between drive and coast, maintains engagement positively in the forward and reverse modes of operation as well as during the transition between forward and reverse, and disengages automatically upon a slight direction reversal when the four-wheel drive system is disengaged.

A deficiency of this clutch is that it includes a ring which develops frictional drag sufficiently high to effect clutch engagement. Thereafter, this high drag continues even though it is not required to maintain clutch engagement. Thus, in order to conserve power, reduce heat, ease the problems of material selection, etc., there was still a need for an automatic clutch of this type which would develop relatively high frictional drag initially to effect automatic clutch engagement, and would develop relatively low frictional drag thereafter.

U.S. Applications Ser. Nos. 868,587, filed Jan. 11, 1978, and 27,347, filed Apr. 5, 1979, are directed to an improved automatic clutch which meets this need. The clutch includes a mechanism for developing frictional drag to effect clutch engagement. The mechanism incorporates a wrapped spring characterized as having relatively high resistance to slippage in the spring-tightening or wrapping direction, and relatively low resistance to slippage in the spring-loosening or unwrapping direction. Upon initial rotation of the driving member, the spring is caused to tighten, thereby effecting clutch engagement. Thereafter, the spring is caused to loosen, thereby reducing frictional drag to a minimum. The improved clutch also includes an actuating mechanism which subjects a movable clutching sleeve to a preload. In the event clutch engagement is blocked, the actuating mechanism can complete its cycle of operation. When the blockage is relieved, the preloaded clutching sleeve completes clutch engagement. This clutch further includes a restraining device which creates high resistance to movement of the movable clutching sleeve. This resistance is effective only during initial rotation of the driving member, thus negating the effect of any spurious force which might tend to rotate the driving member.

There remains a need in the art for an alternative automatic clutch for use in effecting and maintaining engagement between a drive axle and a wheel of a four-wheel drive vehicle upon the application of power to the drive axle. Such an alternative clutch should automatically effect disengagement upon cessation of the application of power to the drive axle, together with a direction reversal.

SUMMARY OF THE INVENTION

This invention is directed to such an alternative automatic clutch. The invention is directed to an automatic clutch for automatically effecting engagement between driving and driven members in response to rotation of the driving member. The clutch maintains engagement between the members so long as the driving member is subject to rotation, and disengages automatically upon slight relative rotation of the members when the driving member is no longer subject to rotation. The clutch of the present invention is adapted for use in four-wheel drive vehicles where it is desirable to provide automatic engagement of, for example, the front wheels when the operator shifts into four-wheel drive, and automatic disengagement when the operator shifts out of four-wheel drive and reverses direction slightly.

The clutch of this invention includes a movable clutching sleeve associated with a driving member and a fixed clutching sleeve associated with a driven member. The movable clutching sleeve is cammed into engagement with the fixed clutching sleeve upon rotation of the driving member. Disengagement is prevented even in the event of a tendency for the driven member to overrun the driving member. As a result, a positive locking relationship is maintained in the drive and coast modes of operation as well as during the transition between drive and coast. Furthermore, the arrangement is such that this relationship is maintained in the forward and reverse modes of operation as well as during the transition between forward and reverse.

The clutch of this invention also includes an alternative mechanism for developing a frictional driving force to cause camming of the movable clutching sleeve. The mechanism incorporates a fixed cam and a movable cam follower. The movable clutching sleeve drives the cam follower upon rotation of the driving member, thereby preloading the clutch for clutch engagement. The mechanism disengages the movable clutching sleeve from the cam follower upon clutch engagement, thereby relieving the frictional driving force.

BRIEF DESCRIPTION OF THE DRAWINGS

The objects and advantages of this invention will become apparent to those skilled in the art upon careful consideration of the specification herein, including the drawings, wherein:

FIG. 1 is a sectional view showing details of the improved automatic clutch in its disengaged position;

FIG. 2 is a partial detailed view of the camming mechanism in the position of FIG. 1;

FIG. 3 is a sectional view, similar to FIG. 1, showing details of the clutch in the engaged position prior to relief of the frictional driving force;

FIG. 4 is a partial detailed view, similar to FIG. 2, showing the camming mechanism in the position of FIG. 3;

FIG. 5 is a sectional view, similar to FIG. 1, showing details of the clutch in its engaged position after relief of the frictional driving force; and FIG. 6 is an exploded perspective view showing details of the camming mechanism.

While this invention is susceptible of embodiment in many different forms, there is shown in the drawings and herein will be described in detail a preferred embodiment. It should be understood that the present disclosure is considered to be an exemplification of the principles of the invention, and is not intended to limit the invention to this embodiment.

DESCRIPTION OF A PREFERRED EMBODIMENT

Referring to the drawings in greater detail, there is shown a rotatable shaft 10, which in one form of the invention may be an axle of a four-wheel drive vehicle. Axle 10 is rotatably supported in a stationary member 12, which in one form of the invention may be a conventional axle housing. A rotatable member 14, which may be a wheel hub, is supported by a suitable bearing 16 for rotation about housing 12. Suitable lock nuts 18 secure bearing 16 in the usual manner. Lock nuts 18 also secure a notched washer 20 or the like to housing 12.

Axle 10 extends outwardly beyond housing 12. A retainer 22 defines an inwardly projecting tab 24, and is secured to the outer end of axle 10 by a bolt 26 or the like. A cover 28 abuts the outer end of wheel hub 14.

A first clutch member incorporates a clutch sleeve 30 secured to axle 10 for rotation therewith and sliding movement relative thereto. A retainer 32 is secured to sleeve 30 by a suitable snap ring 34 or the like. Sleeve 30 defines an end surface 36 opposite retainer 32. Sleeve 30 also defines a first friction surface 38 at its inner end and a tab 40 at its outer end. Tab 40 extends toward tab 24 of retainer 22.

The first clutch member also incorporates a first clutch element 42 supported on clutch sleeve 30 for rotation therewith and sliding movement relative thereto. Clutch element 42 defines a first set of clutch teeth 44. A suitable preload biasing spring 46 or the like is interposed between retainer 32 and clutch element 42 so as to bias element 42 toward end surface 36.

A second clutch member in the form of a sleeve 48 is secured to wheel hub 14 for rotation therewith. Sleeve 48 defines suitable means for holding end cover 28 in place. Sleeve 48 also defines a second set of clutch teeth 50.

An actuating or camming mechanism includes a cam member 52 held by notched washer 20 so as to be fixed relative to housing 12. Cam 52 defines an upstanding ridge 54, a plurality of outwardly diverging rise surfaces 56, a plurality of dwell surfaces 58 merging with rise surfaces 56, and a plurality of stop surfaces 60 merging with dwell surfaces 58. In a preferred form of the invention, the length of each dwell surface 58 should be greater than the backlash between clutch teeth 44,50.

The actuating mechanism also includes a cam follower member 62 which defines an upstanding flange 64 and a plurality of cam follower surfaces 66 diverging outwardly at the same angle as rise surfaces 56 of cam 52. Cam follower 62 also defines a second friction surface 68 contiguous to friction surface 38 of sleeve 30.

The actuating mechanism further includes a retainer 70 having a curved end portion 72 at one end thereof abutting flange 64 of cam follower 62. At the other end thereof, retainer 70 has another curved end portion 74. A suitable cam biasing spring 76 or the like is interposed between ridge 54 of cam 52 and end portion 74 of retainer 70 in such a manner as to bias cam follower 62 toward a first position as shown in FIGS. 1 and 2.

The actuating mechanism further includes a latching device incorporating suitable centrifugal flyweights 78 arranged to pivot about tab 24 of retainer 22 upon rotation of axle 10 above a predetermined threshold speed. An annular ring 80 is slidably received on retainer 22 contiguous to flyweights 78. Between clutch sleeve 30 and ring 80 is interposed a suitable clutch biasing spring 82 or the like for biasing sleeve 30 and flyweights 78 toward the first position shown in FIG. 1.

In this position, surfaces 66 of cam follower 62 are in contact with surfaces 56 of cam 52. Friction surfaces 38,68 are in contact. Clutch element 42 is seated against end surface 36, and clutch teeth 44,50 are out of alignment. The clutch is disengaged, and an associated vehicle would be operating in the two-wheel drive mode.

When the operator engages four-wheel drive, he subjects axle 10 to rotation under power. Sleeve 30 rotates with axle 10 and drives cam follower 62 due to the frictional engagement of surfaces 38,68. Cam follower 62 moves from the position of FIG. 2 to that of FIG. 4, wherein flange 64 rides on one of dwell surfaces 58 and is in abuttment with a stop surface 60. This movement of cam follower 62 moves sleeve 30 to a second position as shown in FIG. 3.

In the second position, teeth 44 are in alignment with teeth 50 for meshing engagement therewith. In the event teeth 44 abut teeth 50 as sleeve 30 slides towards the second position, spring 46 will be compressed, thereby exerting a preload force on clutch element 42. Thereafter, slight relative rotation between teeth 44,50 will allow this preload force to complete movement of teeth 44 into alignment with teeth 50.

As the rotational speed of axle 10 increases, there is attained some predetermined threshold speed above which flyweights 78 pivot about tab 24 from the second position shown in FIG. 3 to a third position as shown in FIG. 5. In this position, flyweights 78 abut tab 40 and slide sleeve 30 outwardly far enough to relieve or break the frictional contact of surfaces 38,68. Sleeve 30 is latched in this position so long as axle 10 rotates above the threshold speed. Teeth 44,50 remain in meshing engagement.

The clutch will remain engaged in either the second or third position so long as axle 10 is subject to rotation under power. In the drive mode, wherein axle 10 tends to rotate wheel hub 14, flange 64 rides on dwell surface 58 in abuttment with stop surface 60. In the coast mode, wherein wheel hub 14 tends to overrun and thus rotate axle 10, flange 64 continues to ride on dwell surface 58 in abuttment with stop surface 60.

Thus, an associated vehicle may shift back and forth between the drive and coast modes, but cam follower 62 will remain in the position of FIG. 4. The clutch will remain engaged.

When the operator desires to move in reverse, he stops the vehicle, shifts the transmission into reverse, and then starts the vehicle once again, all the while remaining engaged in four-wheel drive. Tooth pressure between teeth 44,50 holds elements 42,48 in alignment as sleeve 30 drives cam follower 62 in the opposite direction. The clutch will remain engaged, and flange 64 will ride on the opposite dwell surface 58 in abuttment with the opposite stop surface 60. Although vehicle operation in reverse probably will be at relatively low speeds which may be below the threshold speed for actuation of flyweights 78, this is considered tolerable as reverse operation usually is for relatively short periods of time.

When the operator desires to establish two-wheel drive, he stops the vehicle and disengages four-wheel drive. Axle 10 is no longer subject to rotation under power, but is subject to rotation by teeth 50. The operator then moves the vehicle in the opposite direction slightly, so as to move flange 64 off of dwell surface 58. This allows spring 82 to move sleeve 30 to the first, disengaged position as the operator proceeds in the two-wheel drive mode.

Thus, it will be seen that positive drive is established automatically when four-wheel drive is engaged. Positive drive is maintained in either the drive or coast modes and during the transition between drive and coast. Positive drive is maintained in either the forward or reverse modes, as well as during the transition therebetween.

It is apparent that although the invention provides a novel arrangement for clutching the drive axle and its associated wheels in a four-wheel drive vehicle, it is readily available for use in any environment where automatic clutching between driving and driven members is desired.

It should be understood that while a preferred embodiment of the invention has been shown and described, this is to be considered as illustrative and may be modified by those skilled in the art. It is intended that the claims herein cover all such modifications as may fall within the spirit and scope of the invention.

What is claimed is:

1. An automatic clutch for effecting engagement between rotatable driving and driven members in response to rotation of the driving member, the clutch comprising first and second clutching means respectively rotatable with the driving and driven members, said first clutching means being movable relative to the driving member to first and second positions respectively out of and in clutching engagement with said second clutching means, first biasing means yieldably biasing said first clutching means toward its first position, camming means for moving said said first clutching means to its second position, said camming means including a cam defining rise, dwell and stop surfaces, a cam follower rotatable relative to said cam, and second biasing means yieldably biasing said cam follower toward a first position riding on said rise surface, said cam follower being in frictional engagement with said first clutching means for rotation therewith such that said cam follower rides up said rise surface to a second position riding on said dwell surface, thereby moving said first clutching means to its second position, said cam follower being rotatable with said first clutching means such that said cam follower rides along said dwell surface into contact with said stop surface, said first clutching means being movable relative to the driving member to a third position in clutching engagement with said second clutching means and out of frictional engagement with said cam follower when said cam follower is in contact with said stop surface, and means for moving said first clutching means to its third position.

2. The invention of claim 1, said moving means being responsive to rotation of said driving member for moving said first clutching means to its third position.

3. The invention of claim 2, said moving means being responsive to centrifugal force developed upon rotation of said driving member above a threshold speed for moving said first clutching means to its third position.

4. The invention of claim 3, said moving means including a centrifugal flyweight movable into engagement with said first clutching means for moving it from its second position to its third position and for holding it in its third position.

5. The invention of claim 4, said first biasing means also yieldably biasing said centrifugal flyweight out of engagement with said first clutching means.

6. The invention of claim 1, 2, 3, 4 or 5, said cam defining a pair of diverging rise surfaces, a pair of dwell surfaces respectively merging with said rise surfaces, and a pair of stop surfaces respectively merging with said dwell surfaces, and said first and second clutching means defining clutch teeth adapted for meshing engagement in drive and coast modes, said clutch teeth having a predetermined backlash, said backlash being smaller than the length of each dwell surface.

* * * * *